US012123323B2

(12) United States Patent
Yoshihara

(10) Patent No.: US 12,123,323 B2
(45) Date of Patent: Oct. 22, 2024

(54) FIXING STRUCTURE FOR TURBINE ROTOR BLADE

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventor: Tsutomu Yoshihara, Yokohama Kanagawa (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 18/322,771

(22) Filed: May 24, 2023

(65) Prior Publication Data

US 2024/0175366 A1 May 30, 2024

(30) Foreign Application Priority Data

Nov. 29, 2022 (JP) ................................ 2022-190026

(51) Int. Cl.
*F01D 5/30* (2006.01)
*F01D 5/32* (2006.01)

(52) U.S. Cl.
CPC ........... *F01D 5/3007* (2013.01); *F01D 5/326* (2013.01); *F05D 2240/80* (2013.01); *F05D 2250/75* (2013.01); *F05D 2260/36* (2013.01)

(58) Field of Classification Search
CPC .......... F01D 5/30; F01D 5/3007; F01D 5/326; F05D 2240/80; F05D 2250/75; F05D 2260/30; F05D 2260/36
See application file for complete search history.

(56) References Cited

U.S. PATENT DOCUMENTS 3,936,234 A 2/1976 Tucker et al.
5,749,706 A * 5/1998 Maar ...................... F01D 5/323 29/512

(Continued)

FOREIGN PATENT DOCUMENTS

JP S5194109 A 8/1976
JP H04-119392 U 10/1992

(Continued)

OTHER PUBLICATIONS

Merged translation of WO2016085260 A1 (Year: 2016).*

*Primary Examiner* — Juan G Flores
*Assistant Examiner* — Ryan C Clark
(74) *Attorney, Agent, or Firm* — Foley & Lardner LLP

(57) ABSTRACT

A fixing structure for a rotor blade of an embodiment includes: a fixing groove penetrating blade implantation portions and a rotor wheel in a circumferential direction; a locking blade lastly fitted into a blade groove; and a latch member inserted from an axial direction into the fixing groove formed in the blade implantation portion of the locking blade and the rotor wheel forming the blade groove into which the blade implantation portion of the locking blade is fitted. The latch member includes: an inner peripheral latch disposed on a radially inner side; an outer peripheral latch disposed on a radially outer side; a center latch fitted between the inner peripheral latch and the outer peripheral latch, and a bent portion provided at an end portion on a downstream side in the axial direction of the inner peripheral latch, the bent portion being bent to fix the locking blade.

6 Claims, 21 Drawing Sheets

(56) References Cited

U.S. PATENT DOCUMENTS

| | | | | |
|---|---|---|---|---|
| 8,277,186 | B2 | 10/2012 | Tanaka | |
| 2006/0088419 | A1 * | 4/2006 | Hermiston | F01D 5/326 416/220 R |
| 2007/0020089 | A1 * | 1/2007 | Forgue | F01D 25/04 415/119 |
| 2012/0177499 | A1 * | 7/2012 | Helmis | F01D 5/323 416/220 R |
| 2014/0308133 | A1 * | 10/2014 | Gendraud | F01D 11/006 416/193 A |
| 2016/0265378 | A1 * | 9/2016 | Dungs | F01D 5/3007 |
| 2018/0179904 | A1 * | 6/2018 | Jung | F01D 5/3007 |
| 2019/0078454 | A1 * | 3/2019 | Rudolph | F01D 5/3007 |

FOREIGN PATENT DOCUMENTS

| | | | | |
|---|---|---|---|---|
| JP | H09-209705 | A | 8/1997 | |
| JP | 4886735 | B2 | 2/2012 | |
| WO | WO-2016085260 | A1 * | 6/2016 | F01D 5/02 |

* cited by examiner

FIXING STRUCTURE FOR TURBINE ROTOR BLADE

CROSS REFERENCE TO RELATED APPLICATIONS

This application is based upon and claims the benefit of priority from Japanese Patent Application No. 2022-190026, filed on Nov. 29, 2022; the entire contents of which are incorporated herein by reference.

FIELD

Embodiments described herein relate generally to a fixing structure for a turbine rotor blade.

BACKGROUND

A turbine stage of a steam turbine is constituted by a stator blade cascade and a rotor blade cascade on an immediately downstream side of this stator blade cascade. The steam turbine is provided with a plurality of turbine stages in an axial direction of a turbine rotor. Here, a downstream side means a downstream side of the main flow direction of a working fluid in a center axis direction of the turbine rotor. Note that an upstream side means an upstream side of the main flow direction of the working fluid in the center axis direction of the turbine rotor. Further, the center axis direction of the turbine rotor is hereinafter simply referred to as an axial direction.

In general, in a further downstream stage of the turbine stages of the steam turbine, steam has lower temperatures and pressures and further volume expansion. The introduction of this expanded steam also increases a height of a steam passage in a radial direction of the turbine stage in the further downstream stage. This causes a turbine rotor blade to have a longer blade length in the further downstream stage. Further, centrifugal force applied to the turbine rotor blade in rotation increases in the further downstream stage. Note that the radial direction is a direction, with the center axis of the turbine rotor as a base point, perpendicular to the center axis. Further, the turbine rotor blade is hereinafter simply referred to as a rotor blade.

In the steam turbine, for the rotor blade in the final stage or the stage previous to the final stage, to support the centrifugal force applied to the rotor blade, an implanted structure in circumferential insertion-type implantation form (saddle-type implantation, T-shaped implantation, or the like), radial insertion-type implantation form (fork-type implantation or the like), or axial insertion-type implantation form (axial entry-type implantation or the like) is used. Then, the rotor blade is coupled to a rotor wheel by any of these implanted structures.

Here, FIG. 19 is a plan view of a conventional fixing structure for a rotor blade 210 and a locking blade 210A using the implanted structure in the axial insertion-type implantation form when viewed from an axially downstream side. FIG. 20 illustrates a cross section taken along X-X in FIG. 19. FIG. 21 illustrates a cross section taken along Y-Y in FIG. 19. Note that FIG. 20 mainly illustrates the fixing structure for the rotor blade 210. Further, FIG. 21 mainly illustrates the fixing structure for the locking blade 210A. Further, the cross sections in FIG. 20 and FIG. 21 are each a cross section when the cross section in the radial direction is viewed from a circumferential direction.

The locking blade 210A is, of a plurality of the rotor blades 210 constituting a rotor blade cascade 200, the rotor blade lastly incorporated into a rotor wheel 251.

As illustrated in FIG. 19, a blade implantation portion 211 of the rotor blade 210 and a blade implantation portion 211A of the locking blade 210A are inserted and fitted from the axial direction into blade grooves 252 formed in the rotor wheel 251 of a turbine rotor 250. After the rotor blades 210 except for the locking blade 210A are fitted into the blade grooves 252, the locking blade 210A is inserted into the blade groove 252 from the axial direction. Then, as illustrated in FIG. 19, the blade implantation portion 211A of the locking blade 210A is fitted into the blade groove 252.

As illustrated in FIG. 20 and FIG. 21, in tip portions 212, 212A on the downstream side in the blade implantation portions 211, 211A, a groove 230 in an annular L-shaped cross-sectional shape is formed over the circumferential direction. Further, in bottom portions 253 on the downstream side in the blade grooves 252, a groove 231 in an annular L-shaped cross-sectional shape is formed over the circumferential direction. Thus, the groove 230 and the groove 231 constitute a fixing groove 260 in a T-shaped cross-sectional shape.

Here, the tip portions 212, 212A are portions facing the bottom portions 253 of the blade grooves 252. Further, the bottom portion 253 is an end portion on a radially inner side of the blade groove 252. The circumferential direction is a circumferential direction centered on the center axis of the turbine rotor, that is, an axial circumference of the center axis. Note that the center axis of the turbine rotor is simply referred to as a center axis. The radially inner side is a side approaching the center axis in the radial direction (center axis side). Note that the radially outer side is a side away from the center axis of the turbine rotor in the radial direction.

The fixing groove 260 has an axial groove portion 261 extending in the axial direction, and a radial groove portion 262 extending radially outward and radially inward from the axial groove portion 261. Further, as illustrated in the cross sections in FIG. 20 and FIG. 21, the fixing groove 260 is formed in T-shape by the axial groove portion 261 and the radial groove portion 262.

Note that the fixing groove 260 in the T-shaped cross-sectional shape is also formed in the rotor wheel 251 circumferentially adjacent to the blade grooves 252. Therefore, the fixing groove 260 is formed with an annular groove over the circumferential direction.

The fixing groove 260 is provided with a latch member 270 fixing the rotor blade 210 and a latch member 270A fixing the locking blade 210A.

As illustrated in FIG. 20, the latch member 270 includes an inner peripheral latch 271 and an outer peripheral latch 272. Further, as illustrated in FIG. 21, the latch member 270A includes an inner peripheral latch 271A, a center latch 273, an outer peripheral latch 272A, and a welded portion 264. The center latch 273 is inserted between the inner peripheral latch 271A and the outer peripheral latch 272A. An end portion on the axially downstream side of the center latch 273 is covered with the welded portion 264. The welded portion 264 is formed continuously over a predetermined length in the circumferential direction, as illustrated in FIG. 19.

With the above-described conventional fixing structure, the rotor blade 210 and the locking blade 210A are fixed in the rotor wheel 251. This fixing prevents the rotor blade 210 and the locking blade 210A from dropping out of the blade grooves 252 in the axial direction.

As described above, in the conventional fixing structure in the rotor blade 210 using the implanted structure in the axial insertion-type implantation form, the latch member 270A is fixed by welding after the inner peripheral latch 271A, the center latch 273, and the outer peripheral latch 272A are disposed in the fixing groove 260. The welded portion 264 formed by the welding is formed continuously over the predetermined length in the circumferential direction.

Therefore, the conventional fixing structure requires a preheating step and a heating step for a welded area in the welding. Further, the disassembly for removal of the locking blade 210A requires a chipping step of chipping the welded portion 264 off. Thus, the conventional fixing structure requires complicated work such as the welding step during assembly and the chipping step for the welded portion 264 during the disassembly.

DETAILED DESCRIPTION

Hereinafter, an embodiment of the present invention will be described in reference to the drawings.

In one embodiment, a fixing structure for a turbine rotor blade fixes a blade implantation portion of the turbine rotor blade in axial insertion-type implantation form in a blade groove formed in a rotor wheel of a turbine rotor. The fixing structure includes: a fixing groove penetrating the blade implantation portion and the rotor wheel in a circumferential direction of the turbine rotor; a locking blade, of the turbine rotor blade, lastly fitted into the blade groove; and a fixing member inserted from an axial direction of the turbine rotor into the fixing groove formed in the blade implantation portion of the locking blade and the rotor wheel forming the blade groove into which the blade implantation portion of the locking blade is fitted.

Further, the fixing member includes: an inner peripheral fixing member disposed on a radially inner side of the fixing groove; an outer peripheral fixing member disposed on a radially outer side of the fixing groove; a center fixing member fitted between the inner peripheral fixing member and the outer peripheral fixing member; and a bent portion provided at an end portion on a downstream side in the axial direction in the inner peripheral fixing member or the outer peripheral fixing member, the bent portion being bent to the center fixing member side to fix the blade implantation portion of the locking blade in the blade groove.

First Embodiment

Figure 1:
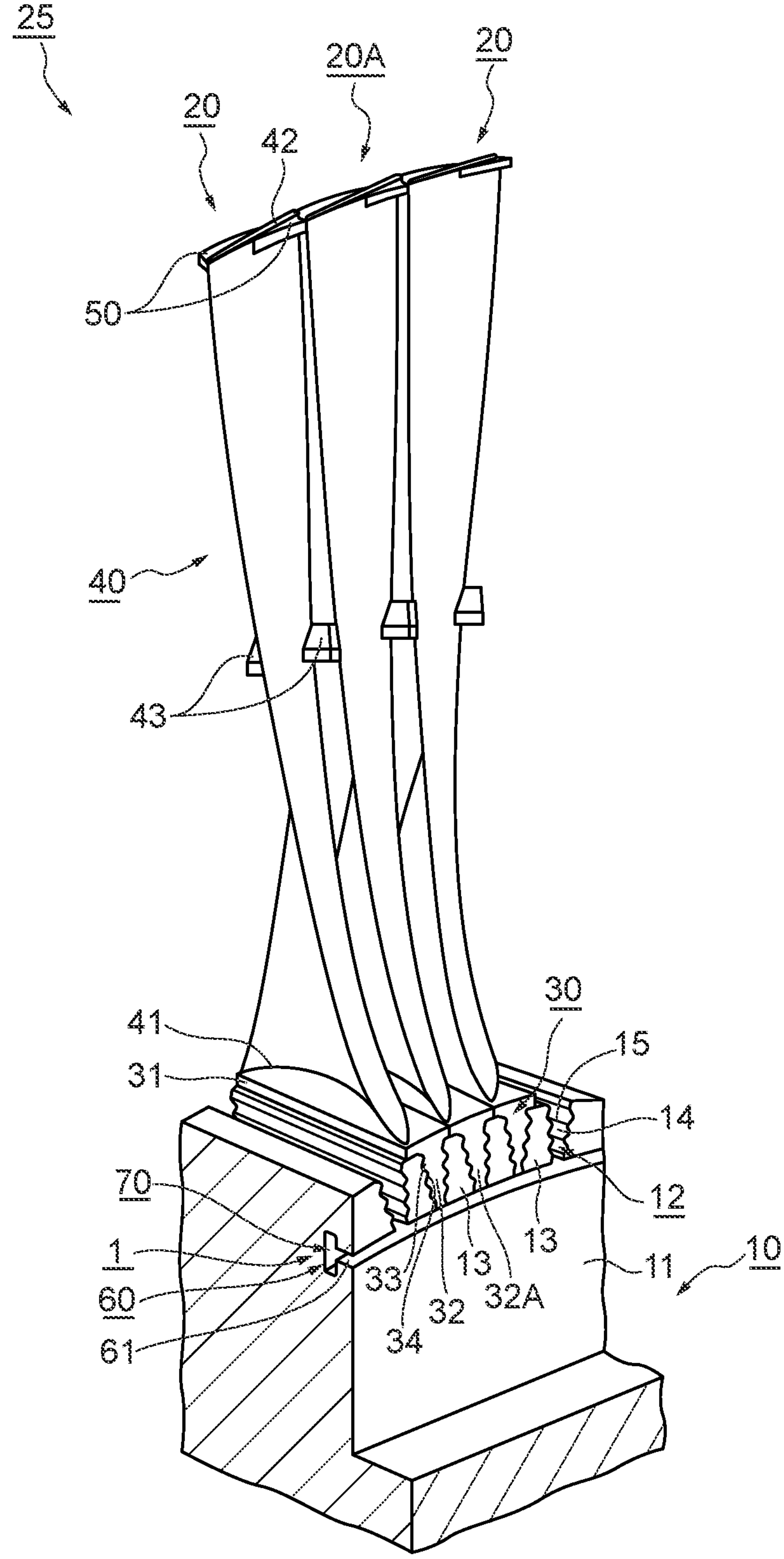
FIG. 1 is a perspective view illustrating a state where a part of the rotor blades to be fixed by a fixing structure for a rotor blade of a first embodiment is fitted into a rotor wheel of a turbine rotor.
Figure 2:
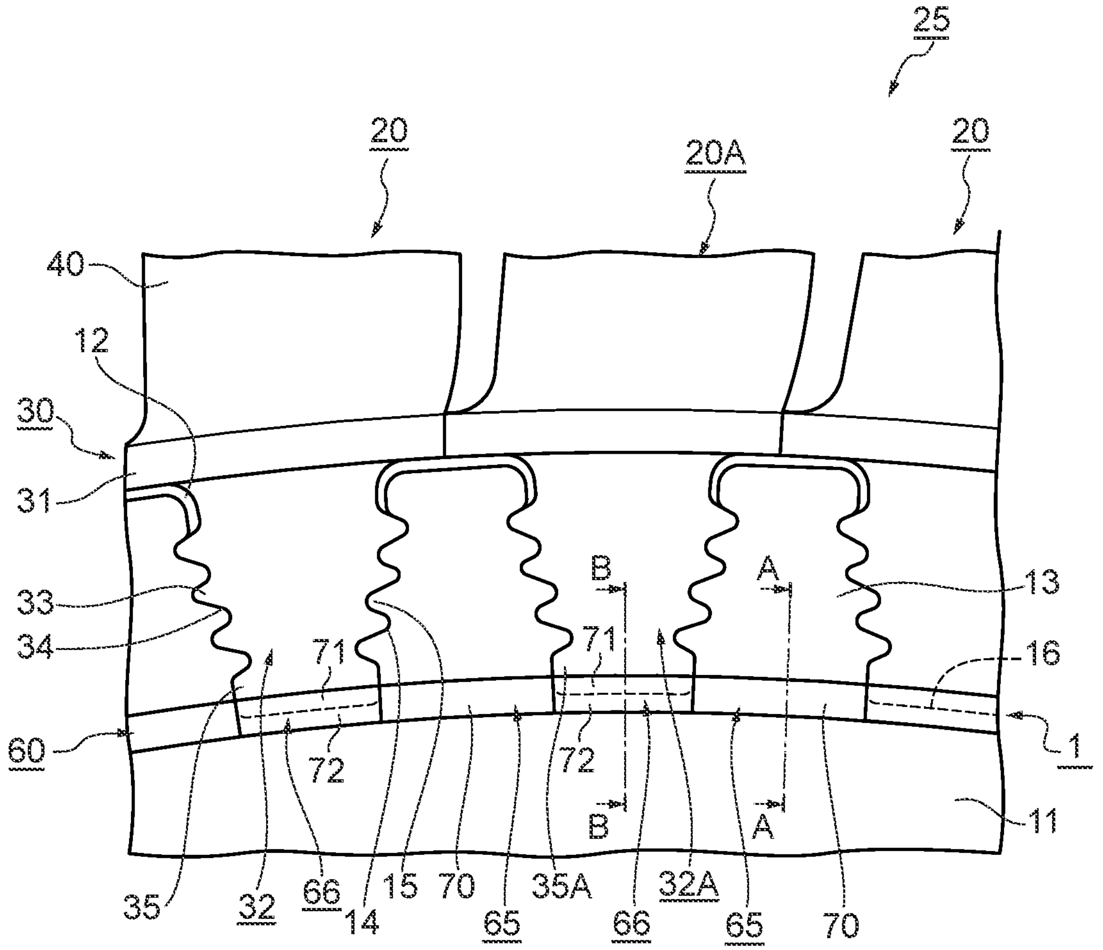
FIG. 2 is a plan view of the state where a part of the rotor blades to be fixed by the fixing structure for the rotor blade of the first embodiment is fitted into the rotor wheel of the turbine rotor when viewed from an axially downstream side.

FIG. 1 is a perspective view illustrating a state where a part of the rotor blades 20 to be fixed by a fixing structure 1 for a rotor blade (turbine rotor blade) 20 of a first embodiment is fitted into a rotor wheel 11 of a turbine rotor 10. FIG. 2 is a plan view of the state where a part of the rotor blades 20 fixed by the fixing structure 1 for the rotor blade 20 of the first embodiment is fitted into the rotor wheel 11 of the turbine rotor 10 when viewed from an axially downstream side. Note that FIG. 1 and FIG. 2 each illustrate a state where later-described latch members 90, 90A of the fixing structure 1 are not provided. Further, in FIG. 2, a shape of a bottom portion 16 of a blade groove 12 is indicated with a dotted line.

The fixing structure 1 for the rotor blade 20 of this embodiment is a fixing structure for the rotor blade 20 having an implanted structure in axial insertion-type implantation form (axial entry-type implantation form). The implanted structure in the axial insertion-type implantation form is suitable for a long rotor blade to which high centrifugal force is applied. In this embodiment, a turbine stage of a steam turbine provided with the long rotor blade is exemplified and described. The long rotor blade 20 is provided in the turbine stage in the final stage or the previous stage to the final stage of the steam turbine, for example.

Note that also in the embodiment, the respective meanings of an upstream side, a downstream side, an axial direction, a circumferential direction, a radial direction, a radially inner side, and a radially outer side are as previously described.

The rotor wheel 11 is constituted by an annular ridge portion formed over the circumferential direction while projecting radially outward from an outer peripheral face of the turbine rotor 10. As illustrated in FIG. 1, in an outer peripheral portion of the rotor wheel 11 of the turbine rotor 10, a plurality of blade grooves 12 penetrating in the axial direction (the axial direction of the turbine rotor 10) are provided at predetermined intervals in the circumferential direction (the circumferential direction of the turbine rotor 10). In other words, the blade groove 12 is provided between wheel posts 13 of the rotor wheel 11.

On wall faces on circumferentially both sides of the wheel post 13 of the rotor wheel 11, as illustrated in FIG. 1 and FIG. 2, a wheel neck portion (concave portion) 14 and a wheel hook portion (convex portion) 15 projecting in the circumferential direction (to the blade groove 12 side) oppositely to the wheel neck portion 14 are provided. A plurality of the wheel neck portions 14 and a plurality of the wheel hook portions 15 are alternately provided in the radial direction.

The rotor blade 20 includes a blade root portion 30, a blade effective portion 40, and an integral cover 50, as illustrated in FIG. 1.

The blade root portion 30 includes a blade implantation portion 32 inserted and fitted into the blade groove 12 from the axial direction, and a plate-shaped platform 31 provided between the blade implantation portion 32 and the blade effective portion 40, as illustrated in FIG. 2.

The blade implantation portion 32 includes a blade hook portion (convex portion) 33 engaged in the wheel neck portion 14 and a blade neck portion (concave portion) 34 engaged in the wheel hook portion 15. The blade hook portions 33 and the blade neck portions 34 are alternately provided in the radial direction. The blade implantation portion 32 is formed in the so-called Christmas tree shape.

The blade effective portion 40 extends radially outward from the platform 31. The blade effective portion 40 is twisted from a blade root 41 over a blade tip 42, for example. In a rotor blade cascade 25 provided with a plurality of the rotor blades 20 in the circumferential direction, a working fluid passes between the blade effective portions 40 of the adjacent rotor blades 20.

The integral cover 50 is provided at the blade tip 42 of the blade effective portion 40. The rotation of the rotor blades 20 produces an untwist to the blade effective portions 40 to couple the integral covers 50 of the adjacent rotor blades 20. Then, the annularly coupled integral covers 50 constitute a coupling structure on the whole circumference as one group.

Note that FIG. 1 illustrates one example in which the blade effective portion 40 includes an intermediate coupling member 43. The rotation of the rotor blades 20 couples the intermediate coupling members 43 of the adjacent rotor blades 20 to constitute the coupling structure on the whole circumference as one group, similarly to the integral covers 50.

Note that, here, the blade twisted from the blade root 41 over the blade tip 42 is exemplified and described, and a shape of the rotor blade 20 is not limited to this. That is, the rotor blade 20 only needs to be a rotor blade having the implanted structure in the axial insertion-type implantation form (axial entry-type implantation form).

The above-described rotor blade 20 is fixed by the fixing structure 1 by fitting the blade implantation portion 32 into the blade groove 12. The plurality of rotor blades 20 are fixed in the circumferential direction to constitute the rotor blade cascade 25. Further, as illustrated in FIG. 1 and FIG. 2, the plurality of rotor blades 20 constituting the rotor blade cascade 25 include a locking blade 20A.

The locking blade 20A is a rotor blade, of the rotor blades 20, lastly fitted into the blade groove 12. That is, the locking blade 20A is one rotor blade 20 of the plurality of rotor blades 20 constituting the rotor blade cascade 25. The configuration of the locking blade 20A is the same as the above-described configuration of the rotor blade 20. Note that, here, for convenience in explanation, the locking blade is denoted by the reference numeral 20A, and further, the blade implantation portion of the locking blade 20A is denoted by the reference numeral 32A.

Next, the fixing structure 1 for the rotor blade 20 and the locking blade 20A will be described.

The fixing structure 1 includes a fixing groove 60 and latch members 90, 90A. The latch member 90 is used for fixing the rotor blade 20 which is not the locking blade 20A. The latch member 90A is used for fixing the locking blade 20A. Note that the latch member 90A functions as a fixing member of the locking blade 20A.

First, the fixing groove 60 will be described.

Figure 3:
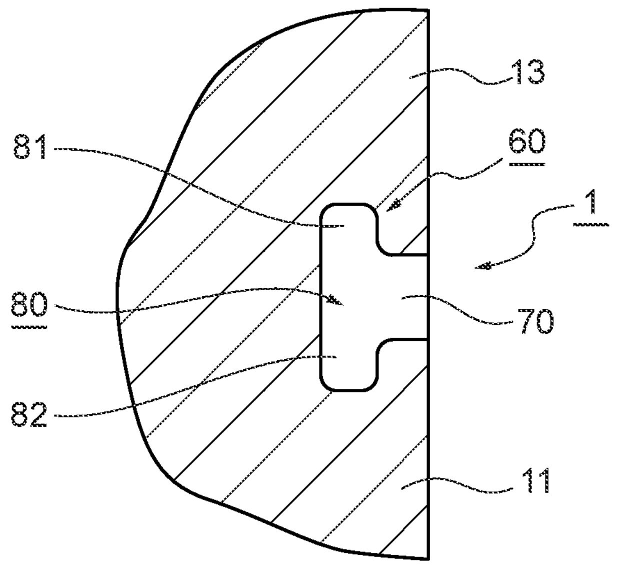
FIG. 3 illustrates a cross section taken along A-A in FIG. 2.
Figure 4:
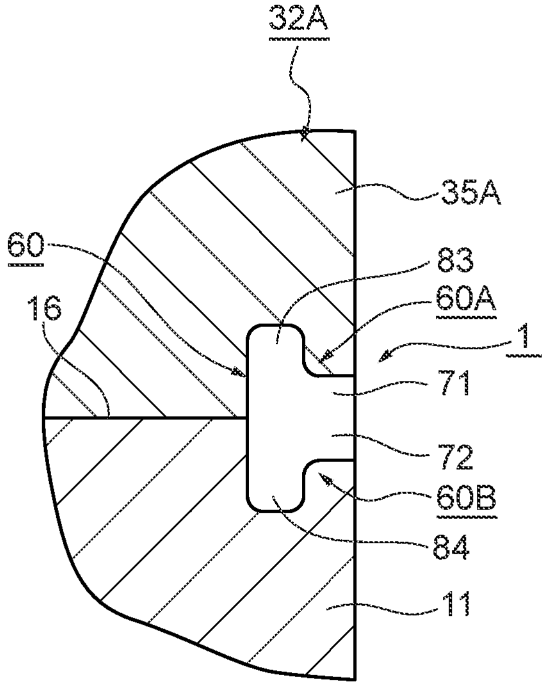
FIG. 4 illustrates a cross section taken along B-B in FIG. 2.

FIG. 3 illustrates a cross section taken along A-A in FIG. 2. FIG. 4 illustrates a cross section taken along B-B in FIG. 2. The cross sections in FIG. 3 and FIG. 4 are each a cross section when the cross section in the radial direction is viewed from the circumferential direction, and each illustrate the enlarged fixing structure 1.

The fixing groove 60 is a groove into which the latch members 90, 90A are inserted to fix the rotor blade 20 and the locking blade 20A. As illustrated in FIG. 3 and FIG. 4, the fixing groove 60 penetrates the blade implantation portions 32, 32A and the rotor wheel 11 over the circumferential direction of the turbine rotor 10.

As illustrated in FIG. 3, the fixing groove 60 includes an axial groove portion 70 and a radial groove portion 80. The axial groove portion 70 has an opening at one end. The opening is open to the downstream side in the axial direction. The radial groove portion 80 extends radially outward and radially inward from the other end side of the axial groove portion 70. The fixing groove 60 is constituted by a groove in a T-shaped cross-sectional shape. That is, the fixing groove 60 constitutes an annular groove in the T-shaped cross-sectional shape. Note that the T-shaped cross-sectional shape is a shape when the cross section in the radial direction is viewed from the circumferential direction, as illustrated in FIG. 3 and FIG. 4.

The radial groove portion 80 includes a radially outer groove portion 81 extending radially outward, and a radially inner groove portion 82 extending radially inward.

As illustrated in FIG. 3, in a range where the wheel post 13 is formed in the rotor wheel 11, the fixing groove 60 in the T-shaped cross-sectional shape is formed in the circumferential direction of the rotor wheel 11 (including the wheel post 13). The fixing groove 60 includes the axial groove portion 70 and the radial groove portion 80.

Note that, in the following, for convenience in explanation, the fixing groove 60 constituted by a groove in the T-shaped cross-sectional shape, which is formed integrally with the rotor wheel 11 (including the wheel post 13), is referred to as an integrated fixing groove 65.

On the other hand, as illustrated in FIG. 4, in a position where a tip portion 35A of the blade implantation portion 32A and the bottom portion 16 of the blade groove 12 face each other, the fixing groove 60 is formed to extend over the tip portion 35A of the blade implantation portion 32A and the bottom portion 16 of the blade groove 12.

Note that a cross-sectional shape of the fixing groove 60 in a position where a tip portion 35 of the blade implantation portion 32 and the bottom portion 16 of the blade groove 12 face each other is also the same as the cross-sectional shape of the fixing groove 60 in the position where the tip portion 35A of the blade implantation portion 32A and the bottom portion 16 of the blade groove 12 face each other. Therefore, here, the fixing groove 60 formed to extend over the tip portion 35A of the blade implantation portion 32A and the bottom portion 16 of the blade groove 12 will be described.

In the position where the tip portion 35A of the blade implantation portion 32A and the bottom portion 16 of the blade groove 12 face each other, the fixing groove 60 is constituted by an outer fixing groove 60A on the radially outer side which is formed in the tip portion 35A of the blade implantation portion 32A, and an inner fixing groove 60B on the radially inner side which is formed in the rotor wheel 11 having the bottom portion 16 of the blade groove 12.

The outer fixing groove 60A includes an outer axial groove portion 71 extending in the axial direction and a radially outer groove portion 83 extending radially outward from an upstream-end side of the outer axial groove portion 71. The outer fixing groove 60A is constituted by a groove in an L-shaped cross-sectional shape. The inner fixing groove 60B includes an inner axial groove portion 72 extending in the axial direction and a radially inner groove portion 84 extending radially inward from an upstream-end side of the inner axial groove portion 72. The inner fixing groove 60B is constituted by a groove in an L-shaped cross-sectional shape.

The outer fixing groove 60A in the L-shaped cross-sectional shape and the inner fixing groove 60B in the L-shaped cross-sectional shape are provided to face each other in the radial direction over the circumferential direction. Further, the fixing groove 60 in the T-shaped cross-sectional shape is constituted by the outer fixing groove 60A in the L-shaped cross-sectional shape and the inner fixing groove 60B in the L-shaped cross-sectional shape. Note that the radial direction is a direction perpendicular to the center axis of the turbine rotor.

Note that, in the following, for convenience in explanation, the fixing groove 60 constituted by the groove in the T-shaped cross-sectional shape formed by the outer fixing groove 60A and the inner fixing groove 60B is referred to as a composite fixing groove 66.

Here, the annular fixing groove 60 formed over the circumferential direction is constituted by alternately providing the above-described integrated fixing grooves 65 and composite fixing grooves 66 in the circumferential direction.

Next, the latch members 90, 90A will be described.

Figure 5:
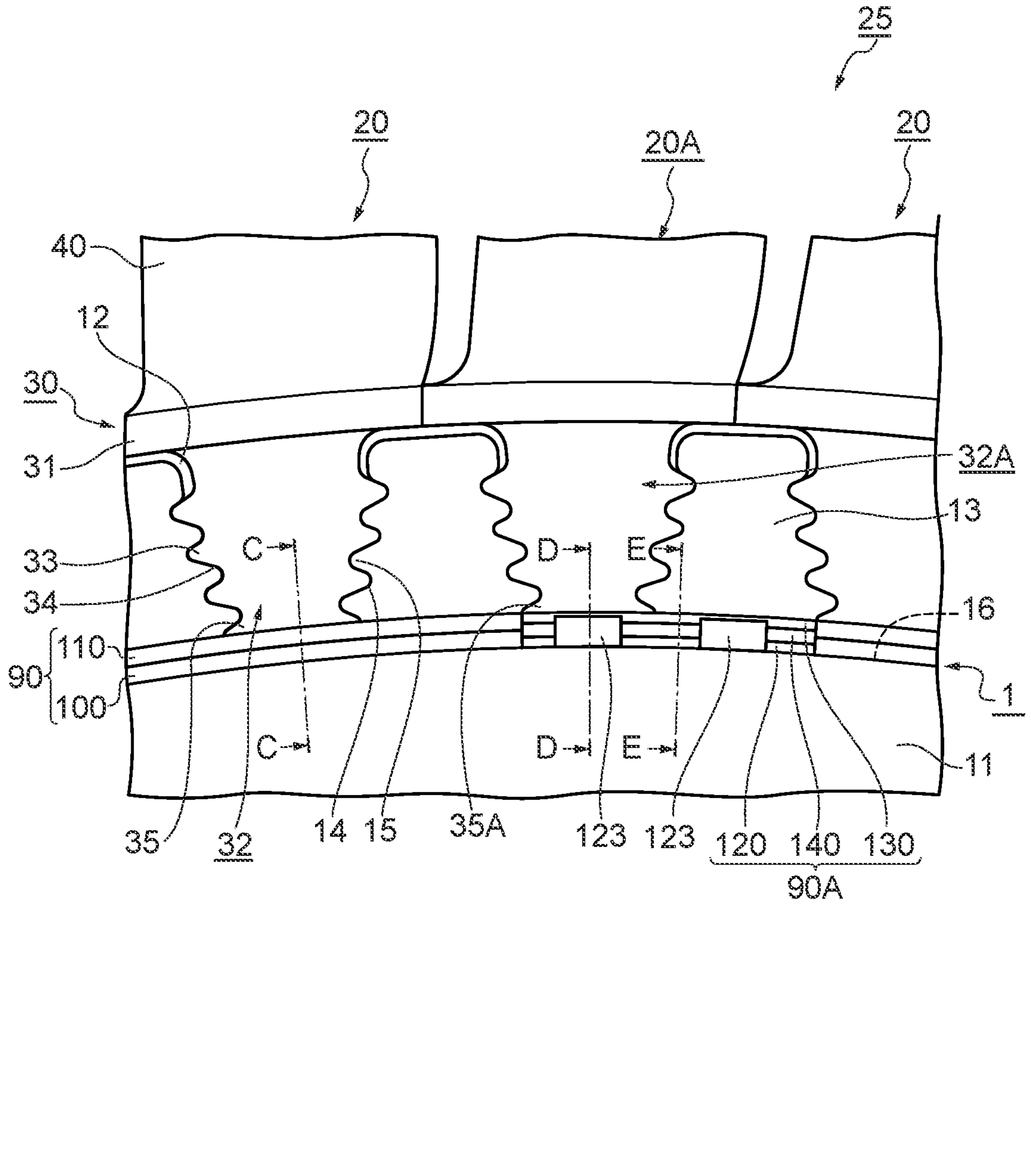
FIG. 5 is a plan view of a part of the rotor blades fixed in the rotor wheel of the turbine rotor by the fixing structure for the rotor blade of the first embodiment when viewed from the axially downstream side.

FIG. 5 is a plan view of a part of the rotor blades 20 fixed in the rotor wheel 11 of the turbine rotor 10 by the fixing structure 1 for the rotor blade 20 of the first embodiment when viewed from the axially downstream side.

First, the latch member 90 fixing the rotor blade 20 which is not the locking blade 20A will be described.

Figure 6:
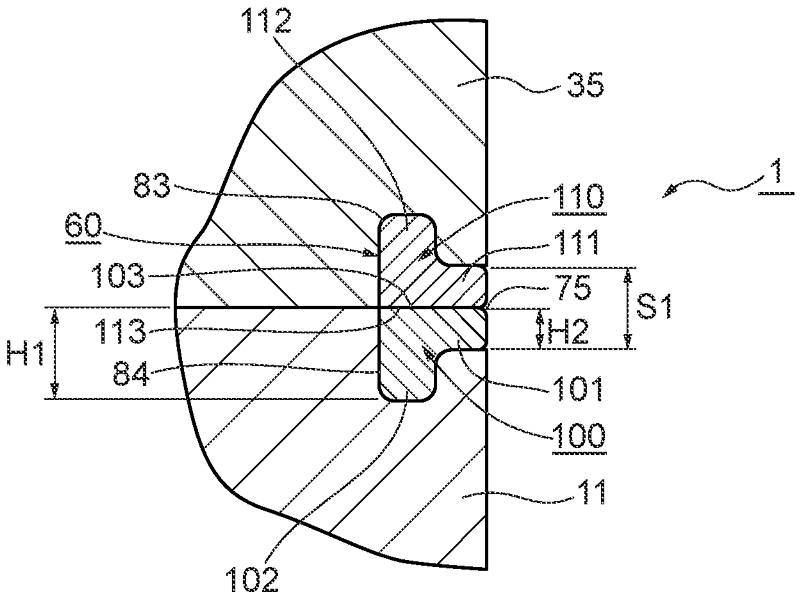
FIG. 6 illustrates a cross section taken along C-C in FIG. 5.
Figure 7:
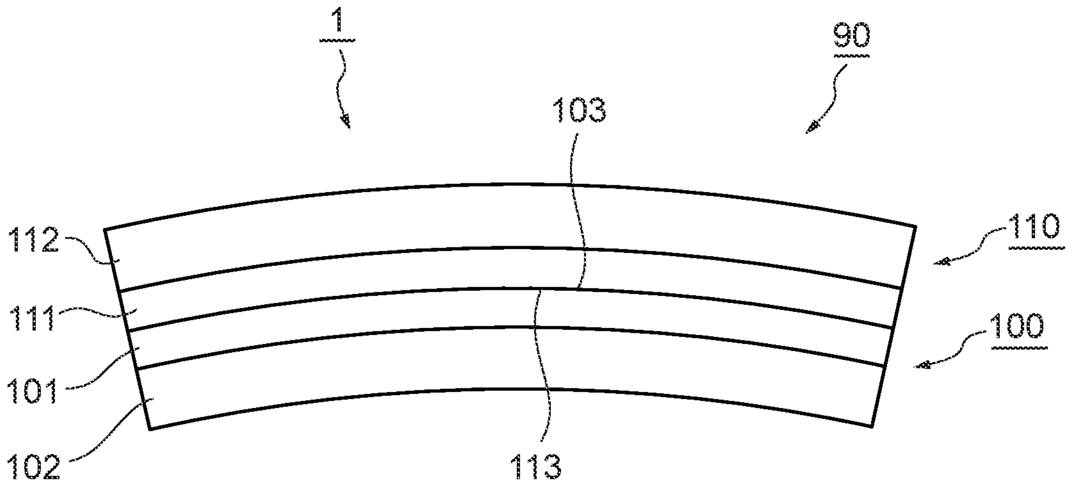
FIG. 7 is a plan view of a latch member in a state of being disposed in a fixing groove when viewed from the axially downstream side in the fixing structure for the rotor blade of the first embodiment.

FIG. 6 illustrates a cross section taken along C-C in FIG. 5. FIG. 7 is a plan view of the latch member 90 in a state of being disposed in the fixing groove 60 when viewed from the axially downstream side in the fixing structure 1 for the rotor blade 20 of the first embodiment.

Note that FIG. 6 illustrates the fixing structure for the rotor blade 20 which is not the locking blade 20A. The cross section in FIG. 6 is a cross section when the cross section in the radial direction is viewed from the circumferential direction, and illustrates the enlarged fixing structure 1. In FIG. 7, the blade implantation portion 32 and the rotor wheel 11 are omitted.

As illustrated in FIG. 5 and FIG. 6, the latch member 90 fixing the rotor blade 20 which is not the locking blade 20A includes an inner peripheral latch 100 disposed on the radially inner side of the fixing groove 60 and an outer peripheral latch 110 disposed on the radially outer side of the fixing groove 60.

The inner peripheral latch 100 includes an axially extending portion 101 and a fitting portion 102. The inner peripheral latch 100 is constituted by a member in the L-shaped cross-sectional shape. The axially extending portion 101 extends in the axial direction when the inner peripheral latch 100 is disposed in the fixing groove 60. The fitting portion 102 extends radially inward from an upstream-end side of the axially extending portion 101 to be fitted into a radially inner groove portion 84 when the inner peripheral latch 100 is disposed in the fixing groove 60.

The outer peripheral latch 110 includes an axially extending portion 111 and a fitting portion 112. The outer peripheral latch 110 is constituted by a member in the L-shaped cross-sectional shape. The axially extending portion 111 extends in the axial direction when the outer peripheral latch 110 is disposed in the fixing groove 60. The fitting portion 112 extends radially outward from an upstream-end side of the axially extending portion 111 to be fitted into a radially outer groove portion 83 when the outer peripheral latch 110 is disposed in the fixing groove 60. Note that downstream ends of the axially extending portions 101, 111 are set not to protrude from an opening 75 on the axially downstream side of the fixing groove 60, for example.

As illustrated in FIG. 7, the inner peripheral latch 100 and the outer peripheral latch 110 are formed in a convex shape curved radially outward corresponding to a shape of the fixing groove 60 formed in the circumferential direction. Further, the inner peripheral latch 100 and the outer peripheral latch 110 are each constituted to have a predetermined width in the circumferential direction. That is, the latch member 90 is constituted to have the predetermined width in the circumferential direction. Then, a plurality of the latch members 90 are disposed in the circumferential direction. The latch members are disposed with the plurality of latch members 90 and the latch member 90A annularly in the fixing groove 60.

As illustrated in FIG. 6 and FIG. 7, the inner peripheral latch 100 and outer peripheral latch 110 are provided in the fixing groove 60 in the T-shaped cross-sectional shape by making an end face 103 on the radially outer side of the inner peripheral latch 100 and an end face 113 on the radially inner side of the outer peripheral latch 110 abut.

Note that the fixing groove 60 illustrated in FIG. 6 is the composite fixing groove 66. Further, an abutting face of the end face 103 and the end face 113 is on the same circumferential face as a contact face of the tip portion 35A of the blade implantation portion 32A and the bottom portion 16 of the blade groove 12, for example.

Note that, here, the latch member 90 disposed in the composite fixing groove 66 in reference to FIG. 6 and FIG. 7 has been described. The latch member being adjacent to the composite fixing groove 66 and disposed in the integrated fixing groove 65 for fixing the rotor blade 20 which is not the locking blade 20A also has the same configuration as that of the above-described latch member 90.

Here, for example, in fixing the one rotor blade 20, the one latch member 90 is disposed over at least both of the composite fixing groove 66 corresponding to the blade groove 12 into which the blade implantation portion 32 of the fixed rotor blade 20 is fitted and the integrated fixing groove 65 adjacent to the composite fixing groove 66. In this case, a circumferential length of the one latch member 90 is set to the sum of a circumferential length of the one composite fixing groove 66 and a circumferential length of the one integrated fixing groove 65. Disposing the one latch member 90 in the one integrated fixing groove 65 restrains the movement of the rotor blade 20 in the axial direction.

Thus, disposing the latch member 90 allows the fixing of the blade implantation portion 32 in the blade groove 12 even when the one rotor blade 20 is fixed by the one latch member 90.

Further, in fixing the rotor blade 20, for example, the blade implantation portions 32 of the four rotor blades 20 are fitted into the blade grooves 12 continuously in the circumferential direction to fix the four rotor blades 20 with the one latch member 90. At this time, a circumferential length of the one latch member 90 is set to the sum of a circumferential length of the four composite fixing grooves 66 and a circumferential length of the four integrated fixing grooves 65.

Next, the latch member 90A fixing the locking blade 20A will be described.

Figure 8:
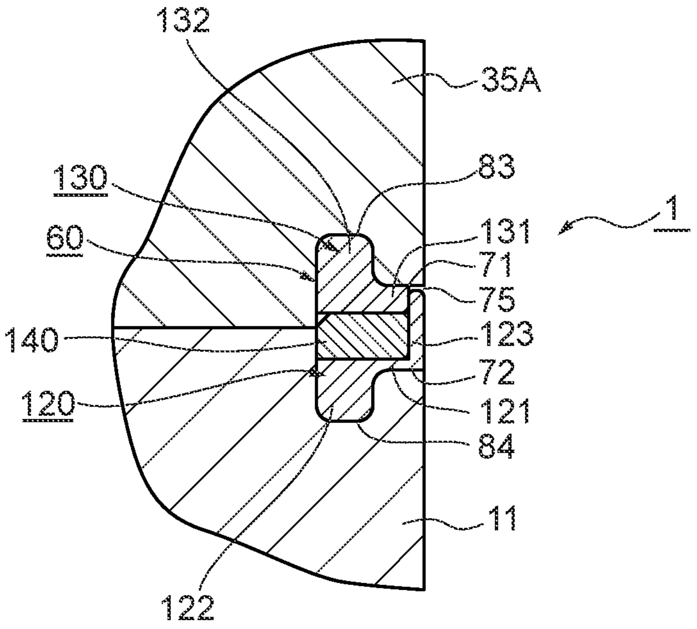
FIG. 8 illustrates a cross section taken along D-D in FIG. 5.
Figure 9:
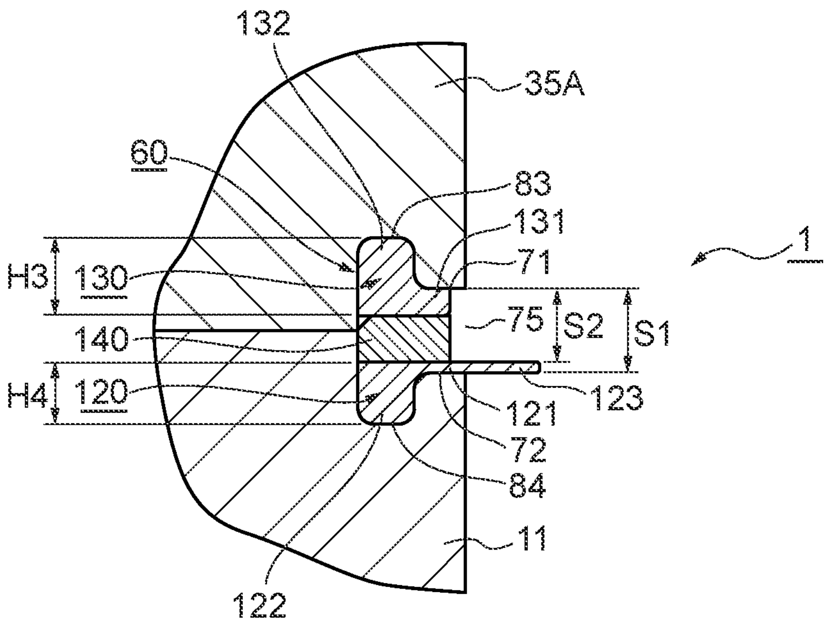
FIG. 9 illustrates a state before bending a bent portion of an inner peripheral latch in the cross section taken along D-D in FIG. 5.
Figure 10:
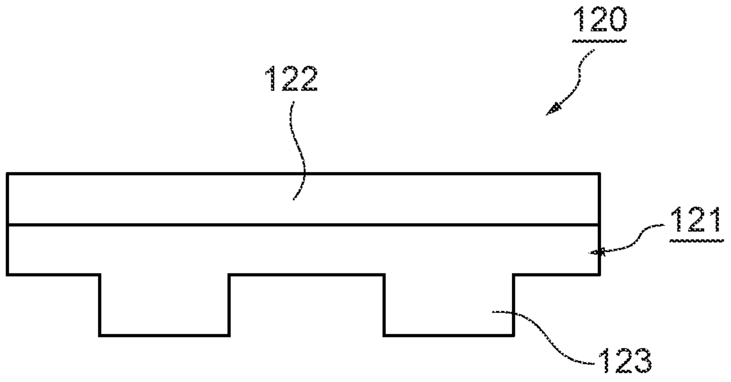
FIG. 10 is a plan view of the inner peripheral latch in a state of being disposed in the fixing groove when viewed from a radially inner side in a fixing structure for a locking blade of the first embodiment.
Figure 11:
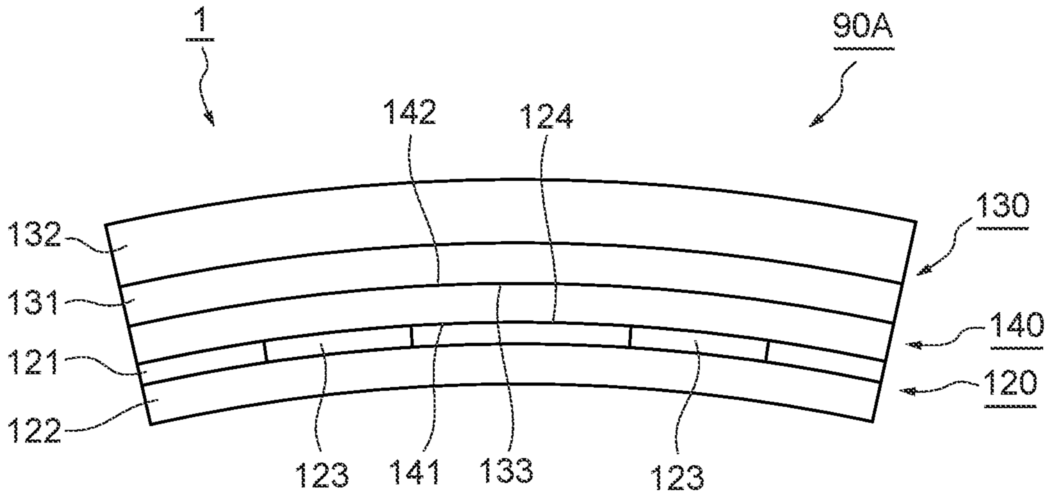
FIG. 11 is a plan view of a latch member in the state of being disposed in the fixing groove when viewed from the axially downstream side in the fixing structure for the locking blade of the first embodiment.
Figure 12:
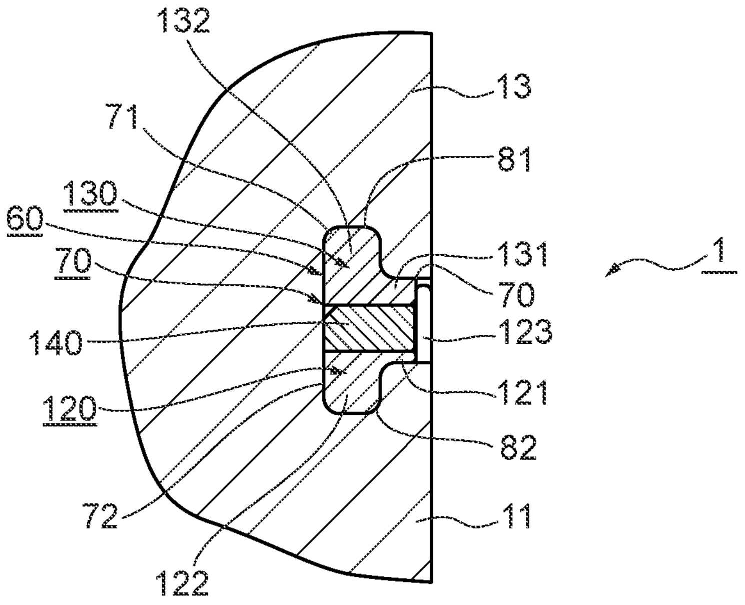
FIG. 12 illustrates a cross section taken along E-E in FIG. 5.

FIG. 8 illustrates a cross section taken along D-D in FIG. 5. FIG. 9 illustrates a state before bending a bent portion 123 of an inner peripheral latch 120 in the cross section taken along D-D in FIG. 5. FIG. 10 is a plan view of the inner peripheral latch 120 in a state of being disposed in the fixing groove 60 when viewed from the radially inner side in the fixing structure 1 for the locking blade 20A of the first embodiment. FIG. 11 is a plan view of the latch member 90A in the state of being disposed in the fixing groove 60 when viewed from the axially downstream side in the fixing structure 1 for the locking blade 20A of the first embodiment. FIG. 12 illustrates a cross section taken along E-E in FIG. 5.

Note that FIG. 8 to FIG. 12 illustrate the fixing structure 1 for the locking blade 20A. The cross sections in FIG. 8, FIG. 9, and FIG. 12 are each a cross section when the cross section in the radial direction is viewed from the circumferential direction, and each illustrate the enlarged fixing structure 1. In FIG. 10 and FIG. 11, the blade implantation portions 32, 32A and the rotor wheel 11 are omitted. Further, the inner peripheral latch 120 illustrated in FIG. 10 is in a state before the bent portion 123 is bent.

The latch member 90A fixes the locking blade 20A lastly fitted into the blade groove 12 in forming the rotor blade cascade 25. The latch member 90A is inserted into the fixing groove 60 from the downstream side in the axial direction to fix the blade implantation portion 32A of the locking blade 20A in the blade groove 12.

The latch member 90A fixing the blade implantation portion 32A of the locking blade 20A includes the inner peripheral latch 120, an outer peripheral latch 130, and a center latch 140, as illustrated in FIG. 8, FIG. 9, FIG. 11, and FIG. 12. Note that the inner peripheral latch 120 functions as an inner peripheral fixing member, the outer peripheral latch 130 functions as an outer peripheral fixing member, and the center latch 140 functions as a center fixing member.

As illustrated in FIG. 8, FIG. 9, and FIG. 12, the inner peripheral latch 120 is disposed on the radially inner side of the fixing groove 60. The inner peripheral latch 120 includes an axially extending portion 121 and a fitting portion 122. The inner peripheral latch 120 before the bent portion 123 is bent is constituted by a member in an L-shaped cross-sectional shape, as illustrated in FIG. 9.

The axially extending portion 121 extends in the axial direction and has the bent portion 123 projecting from the opening 75 of the fixing groove 60 to the downstream side at one end when the inner peripheral latch 120 is inserted into the fixing groove 60. The fitting portion 122 extends radially inward from the other end side of the axially extending portion 121 to be fitted into the radially inner groove portion 84 when the inner peripheral latch 120 is inserted into the fixing groove 60.

A thickness of the axially extending portion 121 is set to be smaller than a thickness of an axially extending portion 131 of the outer peripheral latch 130, for example, as illustrated in FIG. 8 and FIG. 9. In other words, the thickness of the axially extending portion 121 is set to a thickness allowing the bent portion 123 to be bent to the center latch 140 side.

The bent portion 123 is provided at an end portion on the downstream side in the axial direction of the axially extending portion 121, as illustrated in FIG. 9. The bent portions 123 are provided at, for example, two points in the circumferential direction, as illustrated in FIG. 10. The bent portion 123 has, for example, a rectangular shape in the plan view illustrated in FIG. 10. Note that the bent portion 123 only needs to be provided at least at one point in the circumferential direction. Further, the bent portions 123 may be provided at three or more points in the circumferential direction.

The bent portion 123 is set to have a length enough to accommodate a tip portion of the bent portion 123 in the opening 75 of the fixing groove 60 when bent, as illustrated in FIG. 8. Further, when the bent portion 123 is bent, the configuration is preferable to prevent an end face on the downstream side of the bent portion 123 from projecting to the downstream side of the fixing groove 60. When the bent portion 123 is bent, an end face on the upstream side of the bent portion 123 is made to abut on end faces on the downstream side of the axially extending portion 121 and the center latch 140.

Note that the axially extending portion 121 functions as a first axially extending portion, and the fitting portion 122 functions as a first fitting portion.

As illustrated in FIG. 8, FIG. 9, and FIG. 12, the outer peripheral latch 130 is disposed on the radially outer side of the fixing groove 60. The outer peripheral latch 130 includes an axially extending portion 131 and a fitting portion 132. The outer peripheral latch 130 is constituted by a member in an L-shaped cross-sectional shape. Note that the axially extending portion 131 functions as a second axially extending portion, and the fitting portion 132 functions as a second fitting portion.

The axially extending portion 131 extends in the axial direction when the outer peripheral latch 130 is inserted into the fixing groove 60. The fitting portion 132 extends radially outward from an upstream end side of the axially extending portion 131 to be fitted into the radially outer groove portion 83 when the outer peripheral latch 130 is inserted into the fixing groove 60.

The center latch 140 is fitted between the inner peripheral latch 120 and the outer peripheral latch 130. The center latch 140 is constituted by a member in a rectangular cross-sectional shape, for example. In the center latch 140, a corner portion at a radially outer end portion on the upstream side or a corner portion at a radially inner end portion on the upstream side undergoes chamfering. This allows easy fitting of the center latch 140 between the inner peripheral latch 120 and the outer peripheral latch 130. Note that FIG. 8, FIG. 9, and FIG. 12 each illustrate one example of chamfering the corner portion at the radially outer end portion on the upstream side in the center latch 140. Note that at least one of the corner portion at the radially outer end portion and the corner portion at the radially inner end portion on the upstream side is preferably chamfered.

As illustrated in FIG. 11, the inner peripheral latch 120, the center latch 140, and the outer peripheral latch 130 are formed in the convex shape curved radially outward corresponding to the shape of the fixing groove 60 formed in the circumferential direction. Further, the inner peripheral latch 120, the center latch 140, and the outer peripheral latch 130 are each constituted to have a predetermined width in the circumferential direction. That is, the latch member 90A is constituted to have the predetermined width in the circumferential direction.

As illustrated in FIG. 11, an end face 124 on the radially outer side of the inner peripheral latch 120 is made to abut on an end face 141 on the radially inner side of the center latch 140. An end face 133 on the radially inner side of the outer peripheral latch 130 is made to abut on an end face 142 on the radially outer side of the center latch 140. Then, the inner peripheral latch 120, the center latch 140, and the outer peripheral latch 130 are provided in the fixing groove 60 in the T-shaped cross-sectional shape. Note that the inner peripheral latch 120, the center latch 140, and the outer peripheral latch 130 are disposed in the fixing groove 60 from the axially downstream side.

Note that the fixing groove 60 illustrated in FIG. 8 and FIG. 9 is the composite fixing groove 66. The fixing groove 60 illustrated in FIG. 12 is the integrated fixing groove 65.

Here, for example, in fixing the locking blade 20A, the latch member 90A is disposed over both of the composite fixing groove 66 corresponding to the blade groove 12 into which the blade implantation portion 32 A of the locking blade 20A is fitted and the integrated fixing groove 65 adjacent to the composite fixing groove 66. In this case, a circumferential length of the latch member 90A is set to the sum of a circumferential length of the one composite fixing groove 66 and a circumferential length of the one integrated fixing groove 65.

Thus, disposing the latch member 90A including the bent portion 123 allows the fixing of the blade implantation portion 32A in the blade groove 12.

Next, a fixing method of the rotor blades 20 and the locking blade 20A will be described in reference to FIG. 6, FIG. 9, FIG. 13, and FIG. 14.

Figure 13:
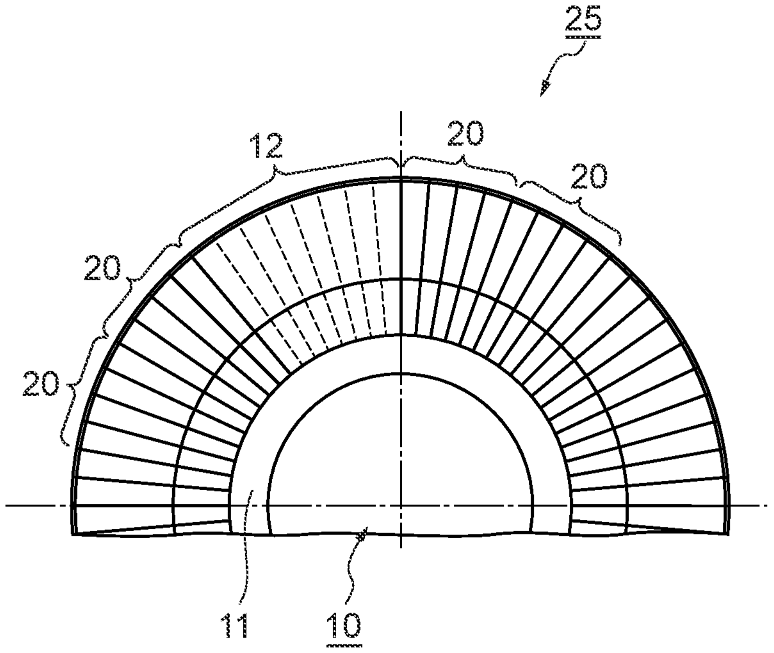
FIG. 13 schematically illustrates a rotor blade cascade to explain a method of fixing the rotor blades and the locking blade in the fixing structure for the rotor blade of the first embodiment.
Figure 14:
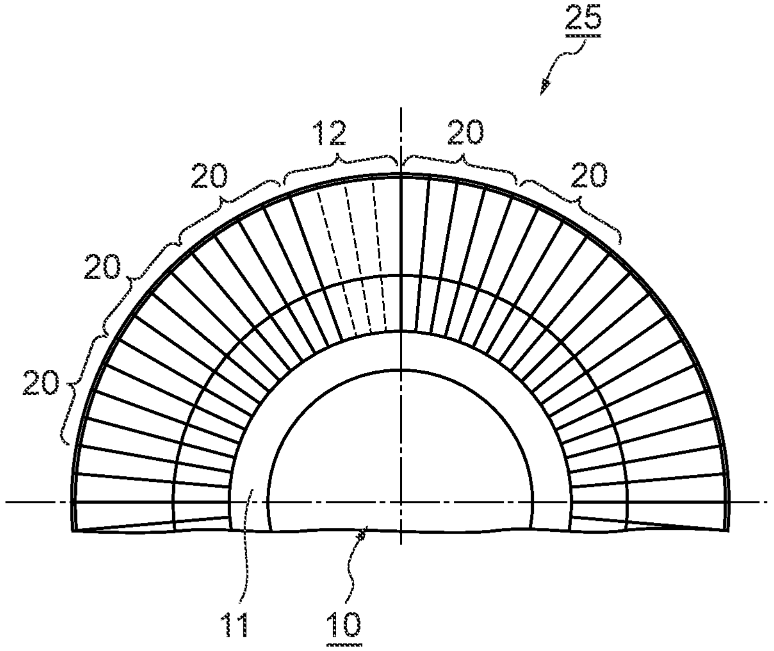
FIG. 14 schematically illustrates the rotor blade cascade to explain the method of fixing the rotor blades and the locking blade in the fixing structure for the rotor blade of the first embodiment.

FIG. 13 and FIG. 14 each schematically illustrate the rotor blade cascade 25 to explain a method of fixing the rotor blades 20 and the locking blade 20A in the fixing structure 1 for the rotor blades 20 of the first embodiment. Note that FIG. 13 and FIG. 14 each illustrate the rotor blade cascade 25 when viewed from the axially downstream side.

In fixing the rotor blade 20, for example, the blade implantation portions 32 of the four rotor blades 20 are fitted into the blade grooves 12 continuously in the circumferential direction. Then, the inner peripheral latch 100 having a circumferential length required to fix the four blade implantation portions 32 is disposed in the blade grooves 12 from the axially downstream side.

Here, as illustrated in FIG. 6, a radial length of the opening 75 is set as S1, a radial length of the fitting portion 102 of the inner peripheral latch 100 is set as H1, and a radial length of the axially extending portion 101 of the inner peripheral latch 100 is set as H2. Note that a radial length of the fitting portion 112 of the outer peripheral latch 110 is also indicated as H1, and a radial length of the axially extending portion 111 of the outer peripheral latch 110 is also indicated as H2.

The radial length S1 is longer than the radial length H1. Further, the radial length S1 is shorter than the double of the radial length H1. That is, the inner peripheral latch 100 is able to be inserted into the fixing groove 60 via the opening 75 from the axially downstream side. However, with the inner peripheral latch 100 disposed in the fixing groove 60, the outer peripheral latch 110 is unable to be inserted into the fixing groove 60 via the opening 75 from the axially downstream side.

Therefore, the outer peripheral latch 110 having the circumferential length required to fix the four blade implantation portions 32 is disposed in the fixing groove 60 from the circumferential direction. Then, as illustrated in FIG. 6, the inner peripheral latch 100 and the outer peripheral latch 110 are disposed in the fixing groove 60.

Here, FIG. 13 illustrates that the blade grooves 12 into which the seven rotor blades 20 and the one locking blade 20A are fitted remain left. From this state, the blade implantation portions 32 of the four rotor blades 20 are fitted into the blade grooves 12 continuously in the circumferential direction as described above. Then, the inner peripheral latch 100 having the circumferential length required to fix the four blade implantation portions 32 is disposed in the blade grooves 12 from the axially downstream side.

After the blade implantation portions 32 of the four rotor blades 20 are fitted into the blade grooves 12, the blade grooves 12 into which the three rotor blades 20 and the one locking blade 20A are fitted remain left as illustrated in FIG. 14. In the state illustrated in FIG. 14, by using a space into which the rotor blades 20 and the locking blade 20A are not yet fitted, the outer peripheral latch 110 having the circumferential length required to fix the four blade implantation portions 32 is disposed in the fixing groove 60 from the circumferential direction.

Subsequently, in the state illustrated in FIG. 14, the blade implantation portions 32 of the two rotor blades 20 are fitted into the blade grooves 12 continuously in the circumferential direction. Then, the inner peripheral latch 100 having a circumferential length required to fix the two blade implantation portions 32 is disposed in the blade grooves 12 from the axially downstream side.

Subsequently, by using a space into which the rotor blade 20 and the locking blade 20A are not yet fitted, the outer peripheral latch 110 having the circumferential length required to fix the two blade implantation portions 32 is disposed in the fixing groove 60 from the circumferential direction.

Subsequently, the blade implantation portion 32 of the one rotor blade 20 is fitted into the blade groove 12. Then, the inner peripheral latch 100 having a circumferential length required to fix the one blade implantation portion 32 is disposed in the blade groove 12 from the axially downstream side.

Subsequently, by using a space into which the locking blade 20A is not yet fitted, the outer peripheral latch 110 having the circumferential length required to fix the one blade implantation portion 32 is disposed in the fixing groove 60 from the circumferential direction.

Subsequently, the blade implantation portion 32A of the locking blade 20A which is the lastly fitted rotor blade 20 is fitted into the blade groove 12. After the locking blade 20A is fitted into the blade groove 12, a space is not present between the locking blade 20A and the rotor blade 20.

Thus, the latch member 90A fixing the locking blade 20A is constituted to allow the disposition in the blade groove 12 from the axially downstream side.

Here, as illustrated in FIG. 9, the radial length of the opening 75 is set as S1, a radial length of the opening 75 in disposing the inner peripheral latch 120 in the blade groove 12 is set as S2, a radial length of the fitting portion 132 of the outer peripheral latch 130 is set as H3, and a radial length of the fitting portion 122 of the inner peripheral latch 120 is set as H4. Note that the radial length S2 is, in other words, a distance between a radially outer surface of the bent portion 123 and a radially outer end portion of the opening 75.

The radial length S1 is longer than the radial length H4. The radial length S2 is longer than the radial length H3. That is, with the inner peripheral latch 120 disposed in the blade groove 12, the outer peripheral latch 130 can be disposed in the fixing groove 60 via the opening 75 from the axially downstream side. Further, between the inner peripheral latch 120 and the outer peripheral latch 130, a gap into which the center latch 140 is fitted is provided.

Thus, the three latches constituting the latch member 90A can be disposed in the fixing groove 60 via the opening 75 from the axially downstream side. Note that the latch member 90A is disposed over both of the composite fixing groove 66 corresponding to the blade groove 12 into which the blade implantation portion 32A of the fixed locking blade 20A is fitted and the integrated fixing groove 65 adjacent to the composite fixing groove 66.

In disposing the latch member 90A, first, the inner peripheral latch 120 having a circumferential length required to fix the blade implantation portion 32A of the locking blade 20A is disposed in the blade groove 12 from the axially downstream side. Subsequently, the outer peripheral latch 130 having the circumferential length required to fix the blade implantation portion 32A of the locking blade 20A is disposed in the blade groove 12 from the axially downstream side.

Subsequently, between the inner peripheral latch 120 and the outer peripheral latch 130, the center latch 140 having the circumferential length required to fix the blade implantation portion 32A of the locking blade 20A is fitted and disposed. Then, after the center latch 140 is disposed, the bent portion 123 is bent to the center latch 140 side. Then, when the bent portion 123 is bent, the downstream-side end face of the bent portion 123 is made to abut on downstream-side end faces of the axially extending portion 131 and the center latch 140. The bent portion 123 prevents the locking blade 20A from dropping to the axially downstream side.

Next, a removal method (disassembly method) of the rotor blade 20 and the locking blade 20A will be described.

In removing the rotor blade 20 and the locking blade 20A, the reverse process to the above-described process of the fixing method is carried out.

First, the bent portion 123 fixing the locking blade 20A is chipped off by, for example, a chipping process. Subsequently, the center latch 140 is removed. Subsequently, the outer peripheral latch 130 and the inner peripheral latch 120 are removed. Then, the locking blade 20A is removed.

Next, the outer peripheral latch 110 fixing the rotor blade 20 is removed in the circumferential direction. Subsequently, the inner peripheral latch 100 is removed. Then, the rotor blade 20 is removed. The rotor blades 20 fixed in the circumferential direction are removed in order by the above-described process.

Note that, here, in removing the locking blade 20A, one example of chipping off the bent portion 123 is presented, and this is not restrictive. For example, the bent portion 123 subjected to bending may be returned to the axially extending state illustrated in FIG. 9.

According to the fixing structure 1 for the rotor blade 20 (locking blade 20A) of the above-described first embodiment, including the bent portion 123 allows the blade implantation portion 32A of the locking blade 20A to be fixed in the blade groove 12 without including a welding step. Further, in the axially extending portion 121 of the inner peripheral latch 120, bending at least the one bent portion 123 provided in the circumferential direction allows the fixing of the locking blade 20A. The fixing structure for the locking blade 20A of this embodiment does not include a welded portion continuing over a predetermined length in the circumferential direction differently from a conventional fixing structure for a locking blade. Therefore, including the fixing structure 1 for the locking blade 20A of this embodiment facilitates work during assembly, which allows a reduction in working time.

Further, in removing the locking blade 20A, chipping off only the bent portion 123 or returning the bent portion 123 to the axially extending state illustrated in FIG. 9 allows the removal of the locking blade 20A. In contrast to this, in a removal process of the conventional locking blade, chipping off the welded portion formed over the predetermined length in the circumferential direction requires complicated work. Thus, including the fixing structure 1 for the locking blade 20A of this embodiment also facilitates work during disassembly, which allows a reduction in working time.

Here, one example in which the inner peripheral latch 120 includes the bent portion 123 is presented on the above-described latch member 90A, and this configuration is not restrictive.

Figure 15:
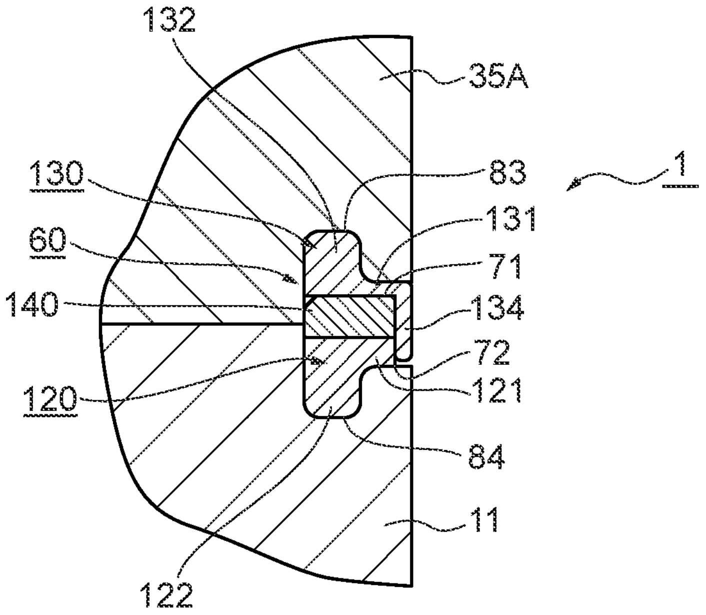
FIG. 15 illustrates a cross section corresponding to the cross section taken along D-D in FIG. 5 when an outer peripheral latch of the latch member includes a bent portion in the fixing structure for the locking blade of the first embodiment.

FIG. 15 illustrates a cross section corresponding to the cross section taken along D-D in FIG. 5 when the outer peripheral latch 130 of the latch member 90A includes a bent portion 134 in the fixing structure 1 for the rotor blade 20 (locking blade 20A) of the first embodiment.

As illustrated in FIG. 15, the outer peripheral latch 130 may include the bent portion 134. In this case, the inner peripheral latch 120 does not include the bent portion 123.

As illustrated in FIG. 15, the outer peripheral latch 130 includes the axially extending portion 131 and the fitting portion 132. Note that the axially extending portion 131 functions as a fourth axially extending portion, and the fitting portion 132 functions as a fourth fitting portion. The outer peripheral latch 130 before the bent portion 134 is bent is constituted by a member in an L-shaped cross-sectional shape, similarly to the inner peripheral latch 120 illustrated in FIG. 9.

The axially extending portion 131 extends in the axial direction and has the bent portion 134 projecting from the opening 75 of the fixing groove 60 to the downstream side at one end when the outer peripheral latch 130 is inserted into the fixing groove 60.

A thickness of the axially extending portion 131 is set to be smaller than a thickness of the axially extending portion 121 of the inner peripheral latch 120, for example, as illustrated in FIG. 15. In other words, the thickness of the axially extending portion 131 is set to a thickness allowing the bent portion 134 to be bent to the center latch 140 side.

The configuration of the bent portion 134 is the same as the configuration of the bent portion 123 illustrated in FIG. 8 and FIG. 9. For example, the bent portion 134 only needs to be provided at least at one point in the circumferential direction.

The configuration in which the outer peripheral latch 130 thus includes the bent portion 134 also can obtain the same operation and effect as the operation and effect in the configuration in which the inner peripheral latch 120 includes the bent portion 123.

Second Embodiment

Figure 16:
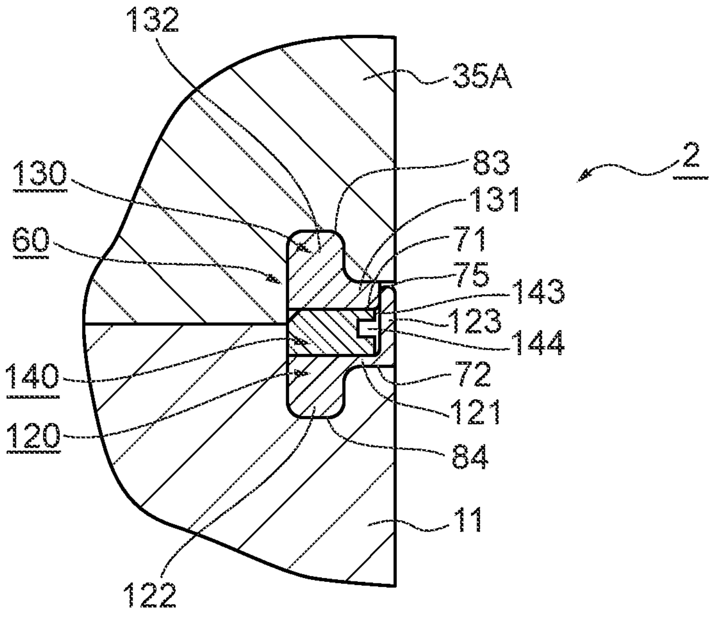
FIG. 16 illustrates a cross section corresponding to the cross section taken along D-D in FIG. 5 in a fixing structure for a locking blade of a second embodiment.
Figure 17:
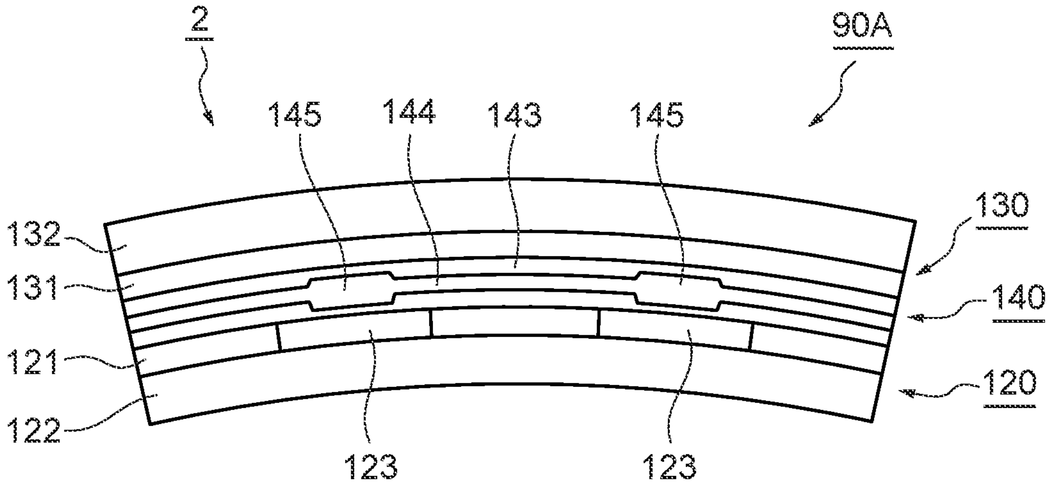
FIG. 17 is a plan view of a latch member in a state of being disposed in a fixing groove when viewed from an axially downstream side in the fixing structure for the locking blade of the second embodiment.

FIG. 16 illustrates a cross section corresponding to the cross section taken along D-D in FIG. 5 in a fixing structure 2 for a rotor blade 20 (locking blade 20A) of a second embodiment. FIG. 17 is a plan view of a latch member 90A in a state of being disposed in a fixing groove 60 when viewed from an axially downstream side in the fixing structure 2 for the locking blade 20A of the second embodiment.

Note that the cross section in FIG. 16 is a cross section when a cross section in a radial direction is viewed from a circumferential direction, and illustrates the enlarged fixing structure 2. In FIG. 17, blade implantation portions 32, 32A and a rotor wheel 11 are omitted. Further, an inner peripheral latch 120 illustrated in FIG. 17 is in a state before a bent portion 123 is bent. Further, in the following embodiment, the same constituent portions as those of the fixing structure 1 for the rotor blade 20 (locking blade 20A) of the first embodiment are denoted by the same reference numerals, and overlapping descriptions are omitted or simplified.

In the fixing structure 2 of the second embodiment, a center latch 140 of a latch member 90A includes a swaging groove 144. The others are constituted in the same manner as those of the fixing structure 1 of the first embodiment. Therefore, here, the configuration different from the configuration of the fixing structure 1 of the first embodiment will be mainly described.

As illustrated in FIG. 16 and FIG. 17, in an end face 143 on the downstream side in the axial direction in the center latch 140 of the latch member 90A, the swaging groove 144 is formed. The swaging groove 144 is formed over the circumferential direction at the radial center of the end face 143. Note that the swaging groove 144 functions as a groove portion.

As illustrated in FIG. 17, the swaging groove 144 has at least one swaged portion 145 in the circumferential direction. The swaged portion 145 is a portion where the swaging groove 144 is extended radially inward and radially outward by swaging. Note that, here, one example of having the two swaged portions 145 in the circumferential direction is presented.

In fixing the locking blade 20A, similarly to the first embodiment, the center latch 140 is fitted and disposed between the inner peripheral latch 120 and an outer peripheral latch 130. Thereafter, the swaging groove 144 undergoes a swaging process to form at least the one swaged portion 145 in the circumferential direction. Subsequently, similarly to the first embodiment, the bent portion 123 is bent to the center latch 140 side.

In removing the locking blade 20A, first, the bent portion 123 fixing the locking blade 20A is chipped off, for example. Note that the bent portion 123 subjected to bending may be returned to the axially extending state illustrated in FIG. 9.

Subsequently, the swaged portion 145 is chipped off. Then, the center latch 140 is removed. Steps after removing the center latch 140 are the same as the steps after removing the center latch 140 in the first embodiment.

Further, a fixing method and a removal method of the rotor blade 20 except for the locking blade 20A are as described in the first embodiment.

In the fixing structure 2 of the second embodiment, the operation and effect by including the bent portion 123 are as described in the first embodiment. That is, the bent portion 123 restrains a movement of the locking blade 20A to the axially downstream side, thereby facilitating work during assembly, which allows a reduction in working time.

Further, in the fixing structure 2, the swaged portion 145 can be formed by swaging a part of the swaging groove 144 provided in the center latch 140. This allows restraint on a movement of the latch member 90A in the circumferential direction.

Third Embodiment

Figure 18:
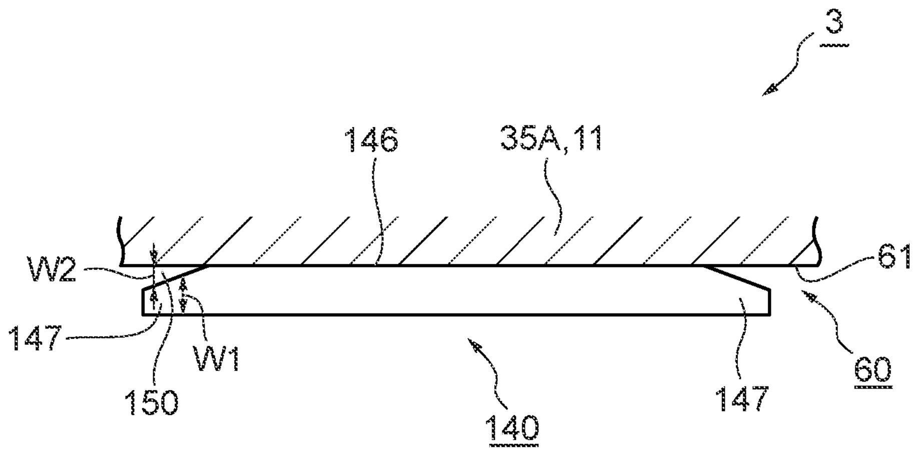
FIG. 18 is a plan view of a center latch of a latch member in a state of being disposed in a fixing groove when viewed from a radially outer side in a fixing structure for a locking blade of a third embodiment.
Figure 19:
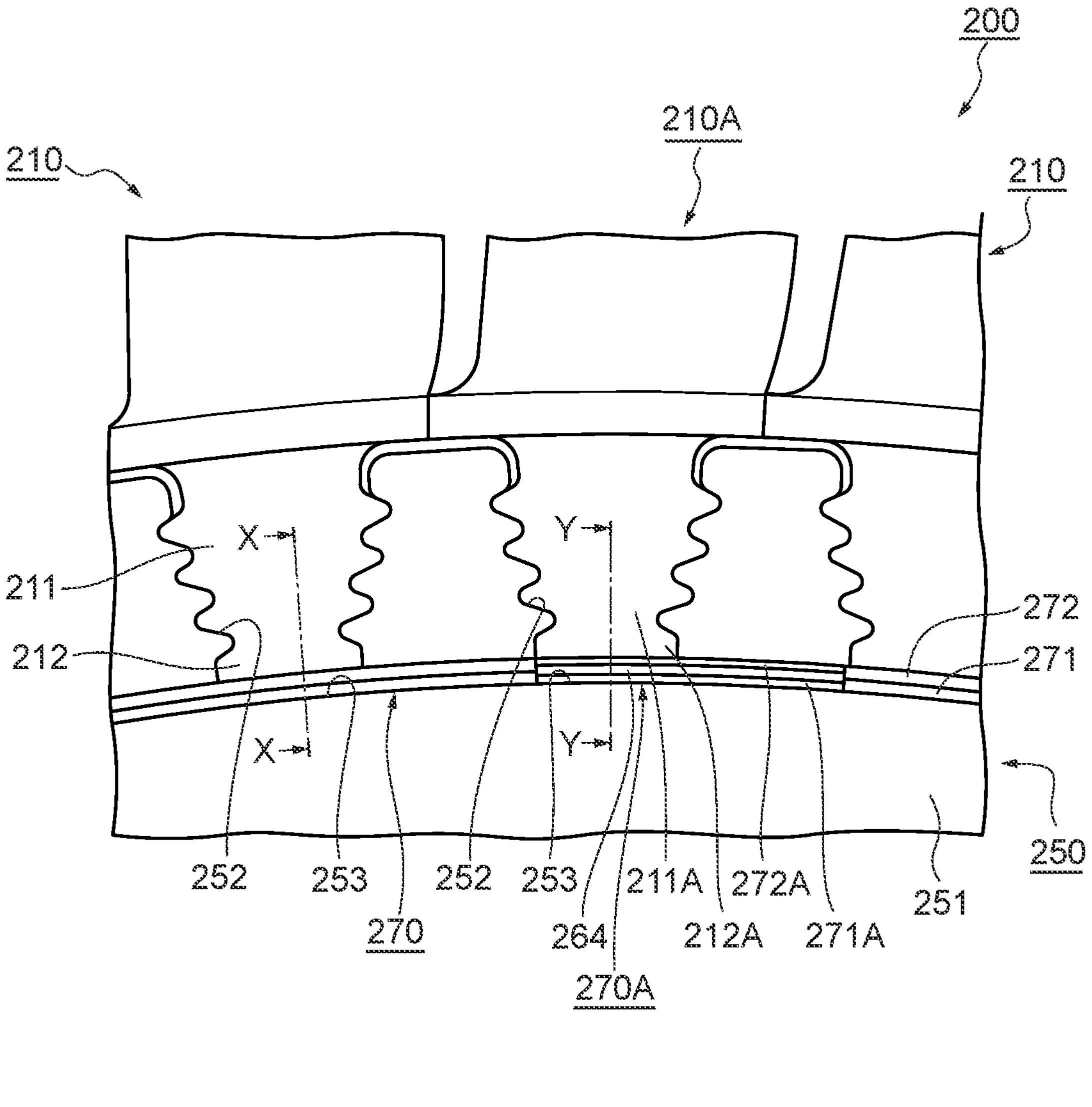
FIG. 19 is a plan view of a conventional fixing structure for a rotor blade and a locking blade using an implanted structure in axial insertion-type implantation form when viewed from an axially downstream side.
Figure 20:
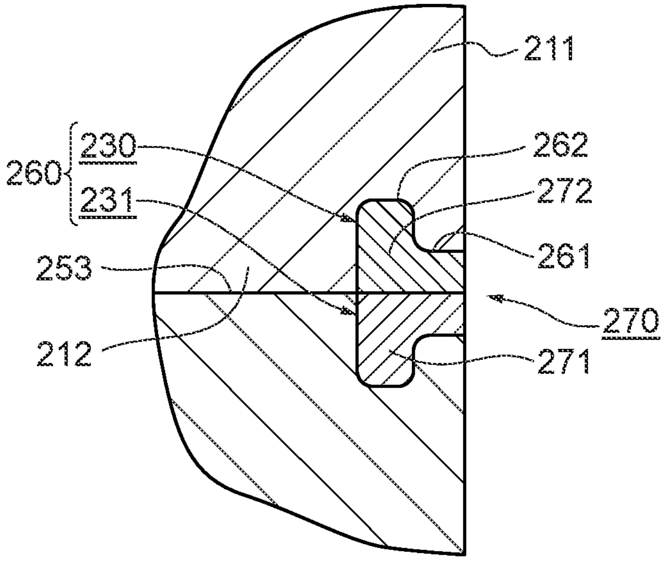
FIG. 20 illustrates a cross section taken along X-X in FIG. 19.
Figure 21:
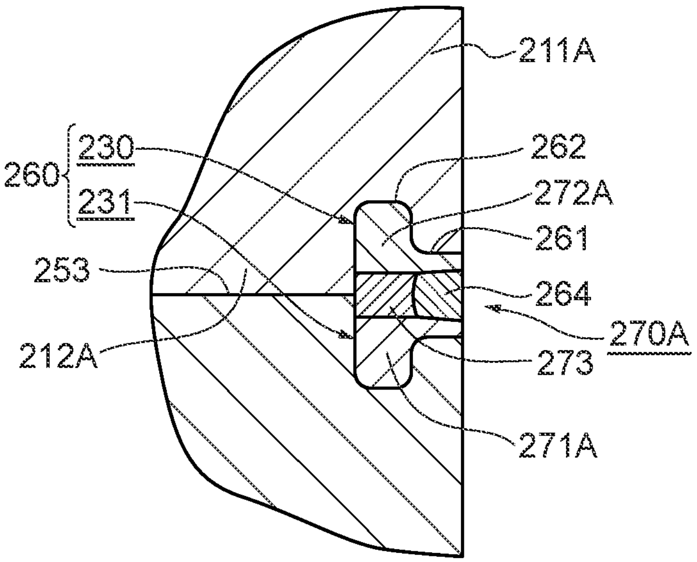
FIG. 21 illustrates a cross section taken along Y-Y in FIG. 19.

FIG. 18 is a plan view of a center latch 140 of a latch member 90A in a state of being disposed in a fixing groove 60 when viewed from a radially outer side in a fixing structure 3 for a rotor blade 20 (locking blade 20A) of a third embodiment.

Note that FIG. 18 illustrates an upstream-side wall portion of the fixing groove 60 to indicate an abutting state of an upstream-side end face 146 in an axial direction of the center latch 140 and an upstream-side end face 61 in the axial direction of the fixing groove 60. The upstream-side wall portion of the fixing groove 60 is constituted by a tip portion 35A of a blade implantation portion 32A and a rotor wheel 11. The upstream-side wall portion of the fixing groove 60 is indicated with oblique lines in FIG. 18.

In the fixing structure 3 of the third embodiment, the center latch 140 of the latch member 90A includes a tapered portion 147. The others are constituted in the same manner as those of the fixing structure 1 of the first embodiment. Therefore, here, the configuration different from the configuration of the fixing structure 1 of the first embodiment will be mainly described.

As illustrated in FIG. 18, in disposing the center latch 140 in the fixing groove 60, both end portions in a circumferential direction of the upstream-side end face 146 of the center latch 140 in contact with the upstream-side end face 61 of the fixing groove 60 include the tapered portions 147 inclined to an axially downstream side. The more circumferentially outer side the tapered portion 147 is on, the smaller an axial thickness W1 of the center latch 140 is.

That is, both the end portions of the upstream-side end face 146 of the center latch 140 including the tapered portions 147 do not abut on the upstream-side end face 61. As illustrated in FIG. 18, at both the end portions in the circumferential direction of the center latch 140, between the upstream-side end face 146 and the upstream-side end face 61, a gap 150 in a wedge shape in which an axial width W2 extends as it is on a more circumferentially outer side is formed. Note that the upstream-side end face 61 functions as a groove end face.

Here, in removing the center latch 140 fitted between the inner peripheral latch 120 and the outer peripheral latch 130, one of the end portions of the center latch 140, which is the tapered portion 147, is pushed in an axially upstream side. This causes the other of the end portions of the center latch

140 to project to the axially downstream side. Therefore, pulling the other projecting end portion out to the axially downstream side allows easy removal of the center latch 140.

Note that, here, one example in which the tapered portions 147 are formed at both the end portions in the circumferential direction of the upstream-side end face 146 of the center latch 140 is presented, and this configuration is not restrictive. The tapered portion 147 only needs to be formed at least at one of both the end portions in the circumferential direction of the upstream-side end face 146 of the center latch 140.

According to the fixing structure 3 of the third embodiment, including the tapered portion 147 at the end portion in the circumferential direction of the upstream-side end face 146 of the center latch 140 allows the easy removal of the center latch 140 in removing the locking blade 20A.

Note that in the fixing structure 3 of the third embodiment, the operation and effect by including a bent portion 123 are as described in the first embodiment.

Here, the center latch 140 of the third embodiment may include a swaging groove 144 similarly to the center latch 140 in the fixing structure 2 of the second embodiment. Further, the swaging groove 144 has at least one swaged portion 145 in the circumferential direction.

Including the swaging groove 144 to have the swaged portion 145 allows restraint on a movement of the latch member 90A in the circumferential direction.

According to the above-described embodiment, work during assembly and during disassembly with facility allows a reduction in work time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A fixing structure for a turbine rotor blade for fixing a blade implantation portion of the turbine rotor blade in axial insertion-type implantation form in a blade groove formed in a rotor wheel of a turbine rotor, the fixing structure comprising:

a fixing groove penetrating the blade implantation portion and the rotor wheel in a circumferential direction of the turbine rotor;

a locking blade, of the turbine rotor blade, lastly fitted into the blade groove; and a fixing member inserted from an axial direction of the turbine rotor into the fixing groove formed in the blade implantation portion of the locking blade and the rotor wheel forming the blade groove into which the blade implantation portion of the locking blade is fitted, the fixing member comprising:

an inner peripheral fixing member disposed on a radially inner side of the fixing groove;

an outer peripheral fixing member disposed on a radially outer side of the fixing groove;

a center fixing member fitted between the inner peripheral fixing member and the outer peripheral fixing member, and a bent portion provided at an end portion on a downstream side in the axial direction in the inner peripheral fixing member or the outer peripheral fixing member, the bent portion being bent to the center fixing member side to fix the blade implantation portion of the locking blade in the blade groove, wherein the fixing groove includes an axial groove portion and a radial groove portion, the axial groove portion has an opening at one end, the opening is open to the downstream side in the axial direction, the radial groove portion extends radially outward and radially inward from an other end side of the axial groove portion, the fixing groove is constituted by a groove in a T-shaped cross-sectional shape, in a case where the bent portion is provided at the inner peripheral fixing member, in being disposed in the fixing groove, the inner peripheral fixing member includes a first axially extending portion extending in the axial direction and having the bent portion projecting from the opening to the downstream side at one end and a first fitting portion extending radially inward from an other end side of the first axially extending portion to be fitted into the radial groove portion, the inner peripheral fixing member is constituted by a member in an L-shaped cross-sectional shape, and in being disposed in the fixing groove, the outer peripheral fixing member includes a second axially extending portion extending in the axial direction and a second fitting portion extending radially outward from an upstream end side of the second axially extending portion to be fitted into the radial groove portion, the outer peripheral fixing member is constituted by a member in an L-shaped cross-sectional shape.

2. The fixing structure for the turbine rotor blade according to claim 1, wherein:

the center fixing member is constituted by a plate-shaped member;

a groove portion is formed in the circumferential direction in an end face on the downstream side in the axial direction of the center fixing member; and the groove portion has a swaged portion extended radially inward and radially outward by swaging.

3. The fixing structure for the turbine rotor blade according to claim 1, wherein in an upstream end face of the center fixing member abutting on a groove end face on an upstream side of the fixing groove, at least one end portion in the circumferential direction is formed in a tapered shape, and the end portion in the tapered shape does not abut on the groove end face.

4. A fixing structure for a turbine rotor blade for fixing a blade implantation portion of the turbine rotor blade in axial insertion-type implantation form in a blade groove formed in a rotor wheel of a turbine rotor, the fixing structure comprising:

a fixing groove penetrating the blade implantation portion and the rotor wheel in a circumferential direction of the turbine rotor;

a locking blade, of the turbine rotor blade, lastly fitted into the blade groove; and a fixing member inserted from an axial direction of the turbine rotor into the fixing groove formed in the blade implantation portion of the locking blade and the rotor wheel forming the blade groove into which the blade implantation portion of the locking blade is fitted, the fixing member comprising:

an inner peripheral fixing member disposed on a radially inner side of the fixing groove;

an outer peripheral fixing member disposed on a radially outer side of the fixing groove;

a center fixing member fitted between the inner peripheral fixing member and the outer peripheral fixing member, and a bent portion provided at an end portion on a downstream side in the axial direction in the inner peripheral fixing member or the outer peripheral fixing member, the bent portion being bent to the center fixing member side to fix the blade implantation portion of the locking blade in the blade groove, wherein the fixing groove includes an axial groove portion and a radial groove portion, the axial groove portion has an opening at one end, the opening is open to the downstream side in the axial direction, the radial groove portion extends radially outward and radially inward from an other end side of the axial groove portion, the fixing groove is constituted by a groove in a T-shaped cross-sectional shape, in a case where the bent portion is provided at the outer peripheral fixing member, in being disposed in the fixing groove, the inner peripheral fixing member includes a third axially extending portion extending in the axial direction and a third fitting portion extending radially inward from an upstream end side of the third axially extending portion to be fitted into the radial groove portion, the inner peripheral fixing member is constituted by a member in an L-shaped cross-sectional shape, and in being disposed in the fixing groove, the outer peripheral fixing member includes a fourth axially extending portion extending in the axial direction and having the bent portion projecting from the opening to the downstream side at one end and a fourth fitting portion extending radially outward from an other end side of the fourth axially extending portion to be fitted into the radial groove portion, the outer peripheral fixing member is constituted by a member in an L-shaped cross-sectional shape.

5. The fixing structure for the turbine rotor blade according to claim 4, wherein:

the center fixing member is constituted by a plate-shaped member;

a groove portion is formed in the circumferential direction in an end face on the downstream side in the axial direction of the center fixing member; and the groove portion has a swaged portion extended radially inward and radially outward by swaging.

6. The fixing structure for the turbine rotor blade according to claim 4, wherein in an upstream end face of the center fixing member abutting on a groove end face on an upstream side of the fixing groove, at least one end portion in the circumferential direction is formed in a tapered shape, and the end portion in the tapered shape does not abut on the groove end face.

* * * * *